United States Patent
Seki

(10) Patent No.: US 12,025,229 B2
(45) Date of Patent: Jul. 2, 2024

(54) SEALING DEVICE

(71) Applicant: NOK CORPORATION, Tokyo (JP)

(72) Inventor: Masatoshi Seki, Kitaibaraki (JP)

(73) Assignee: NOK CORPORATION (JP)

( * ) Notice: Subject to any disclaimer, the term of this patent is extended or adjusted under 35 U.S.C. 154(b) by 16 days.

(21) Appl. No.: 17/781,938

(22) PCT Filed: Oct. 14, 2020

(86) PCT No.: PCT/JP2020/038799
§ 371 (c)(1),
(2) Date: Jun. 2, 2022

(87) PCT Pub. No.: WO2021/117335
PCT Pub. Date: Jun. 17, 2021

(65) Prior Publication Data
US 2022/0373090 A1  Nov. 24, 2022

(30) Foreign Application Priority Data

Dec. 9, 2019 (JP) .................. 2019-222110

(51) Int. Cl.
*F16J 15/32* (2016.01)
*F16J 15/3272* (2016.01)

(52) U.S. Cl.
CPC .................. *F16J 15/3272* (2013.01)

(58) Field of Classification Search
CPC ........ F16J 15/3272; F16J 15/44; F16J 15/441; F16J 15/442
See application file for complete search history.

(56) References Cited

U.S. PATENT DOCUMENTS 5,498,007 A * 3/1996 Kulkarni ............... F16J 15/3412
277/408
5,556,111 A * 9/1996 Sedy .................... F16J 15/3412
277/400

(Continued)

FOREIGN PATENT DOCUMENTS

EP 3821147 A1 5/2021
JP 2015-175474 A 10/2015

(Continued)

OTHER PUBLICATIONS

Notice of Reasons for Refusal issued in corresponding Japanese Patent Application No. 2021-563763 dated Aug. 1, 2023, with English translation (8 Pages).

(Continued)

*Primary Examiner* — Eugene G Byrd
*Assistant Examiner* — L. Susmitha Koneru
(74) *Attorney, Agent, or Firm* — Harness, Dickey & Pierce, P.L.C.

(57) ABSTRACT

An annular sealing device is configured to be mounted in an annular groove provided on the outer periphery of a shaft so as to seal an annular space between the shaft and a housing that rotate with respect to each other, and change the fluid pressure in the space, and maintains the fluid pressure in a target region to be sealed, and slidably contacts a sidewall surface on the low pressure side of the annular groove. The sealing device includes a sliding portion that slides on the sidewall surface; an inner periphery portion that contacts the shaft; a sliding portion groove formed in the sliding portion so as to extend in the circumferential direction, the sliding portion groove being recessed in the direction of the axis; an introduction groove formed so as to extend from the sliding portion groove to the inner periphery portion, the introduction groove being formed so as to extend from the sliding portion groove to the inner periphery portion, the introduc- (Continued)

tion groove being recessed in the direction of the axis; and an inner periphery groove provided in a joined portion of the sliding portion and the inner periphery portion, the inner periphery groove being recessed in the direction of the axis.

6 Claims, 9 Drawing Sheets

(56) References Cited

U.S. PATENT DOCUMENTS

| | | | |
|---|---|---|---|
| 10,309,539 | B2 | 6/2019 | Kakehi et al. |
| 10,865,883 | B2* | 12/2020 | Seki ............... F16J 15/3272 |
| 2006/0055120 | A1 | 3/2006 | Umetsu et al. |
| 2006/0147328 | A1* | 7/2006 | Ito ............... F16J 15/441 417/423.1 |
| 2008/0023919 | A1 | 1/2008 | Umetsu et al. |
| 2008/0277882 | A1 | 11/2008 | Kyohei et al. |
| 2017/0009889 | A1* | 1/2017 | Seki ............... F16J 15/3272 |
| 2020/0217419 | A1* | 7/2020 | Seki ............... F16J 15/3272 |
| 2021/0164571 | A1 | 6/2021 | Kimura et al. |

FOREIGN PATENT DOCUMENTS

| | | |
|---|---|---|
| WO | 03-100301 A1 | 12/2003 |
| WO | 2015-111707 A1 | 7/2015 |
| WO | 2019-221231 A1 | 11/2019 |
| WO | 2020-014123 A1 | 1/2020 |

OTHER PUBLICATIONS

International Search Report for corresponding International Application No. PCT/JP2020/038799 dated Nov. 10, 2020, with English translation (5 Pages).

Written Opinion for corresponding International Application No. PCT/JP2020/038799 dated Nov. 10, 2020, with English translation (8 Pages).

International Preliminary Report on Patentability for corresponding International Application No. PCT/2020/038799 dated May 17, 2022, with English translation (9 Pages).

Extended European Search Report for corresponding Application No. 20898125.8 dated Dec. 5, 2023 (10 Pages).

Office Action issued in corresponding Korean Patent Application No. 10-2022-7019301 dated Oct. 22, 2023, with English translation (11 Pages).

* cited by examiner

SEALING DEVICE

CROSS REFERENCE TO RELATED APPLICATIONS

This is the National Stage of International Application No. PCT/JP2020/038799, filed Oct. 14, 2020, which claims the benefit of Japanese Patent Application No. 2019-222110 filed Dec. 9, 2019, and the disclosure of which are hereby incorporated by reference in their entirety.

BACKGROUND

Technical Field

The present disclosure relates to a sealing device.

Related Art

Conventionally, a sealing device is known that is used as a seal ring for a rotating shaft of various transmissions, such as an automatic transmission (AT) and a continuously variable transmission (CVT), for automobiles, for example (hereinafter simply referred to as a "sealing device"). As such a sealing device, a sealing device has been disclosed in which a dynamic pressure generating groove is provided on a side of a sliding portion that slides on a sidewall surface, the dynamic pressure generating groove including a first groove having a constant width in a radial direction and extending in a circumferential direction, and a second groove extending from a central position of the first groove in the circumferential direction to an inner peripheral surface and adapted to guide a target fluid to be sealed into the first groove (for example, see WO 2015/111707).

Technical Problem

By the way, to address the environmental issues, there has been a demand that the sealing device used for the rotating shaft of various transmissions be further improved to reduce rotation torque.

The present disclosure has been made in view of the above issues, and it is an object of the present disclosure to provide a sealing device that can reduce rotation torque.

SUMMARY

To achieve the aforementioned object, a sealing device according to the present disclosure is an annular sealing device that is configured to be mounted in an annular groove provided on an outer periphery of a shaft so as to seal an annular space between the shaft and a housing that rotate with respect to each other, and change a fluid pressure in the space, and that maintains a fluid pressure in a target region to be sealed, and slidably contacts a sidewall surface on a low pressure side of the annular groove, including a sliding portion that slides on the sidewall surface; an inner periphery portion that contacts the shaft; a sliding portion groove formed in the sliding portion so as to extend in a circumferential direction, the sliding portion groove being recessed in a direction of an axis; an introduction groove formed so as to extend from the sliding portion groove to the inner periphery portion, the introduction groove being recessed in the direction of the axis; and an inner periphery groove provided in a joined portion of the sliding portion and the inner periphery portion, the inner periphery groove being recessed in the direction of the axis.

In the sealing device according to an aspect of the present disclosure, the inner periphery groove extends in the circumferential direction and is continuous in an annular shape around the joined portion.

In the sealing device according to an aspect of the present disclosure, the sliding portion groove is provided in a region where the sliding portion groove can contact the sidewall surface in a radial direction of the sliding portion in a usage state.

In the sealing device according to an aspect of the present disclosure, the introduction groove is provided at a position of an end portion of the sliding portion groove in the circumferential direction.

In the sealing device according to an aspect of the present disclosure, the introduction groove is provided at a central position of the sliding portion groove in the circumferential direction.

In the sealing device according to an aspect of the present disclosure, the sliding portion groove is formed such that the sliding portion groove has a constant width in the radial direction.

Effects of Disclosure

With a sealing device according to the present disclosure, rotation torque can be reduced.

DETAILED DESCRIPTION

Hereinafter, an embodiment of the present disclosure will be described with reference to the drawings.

Figure 1:
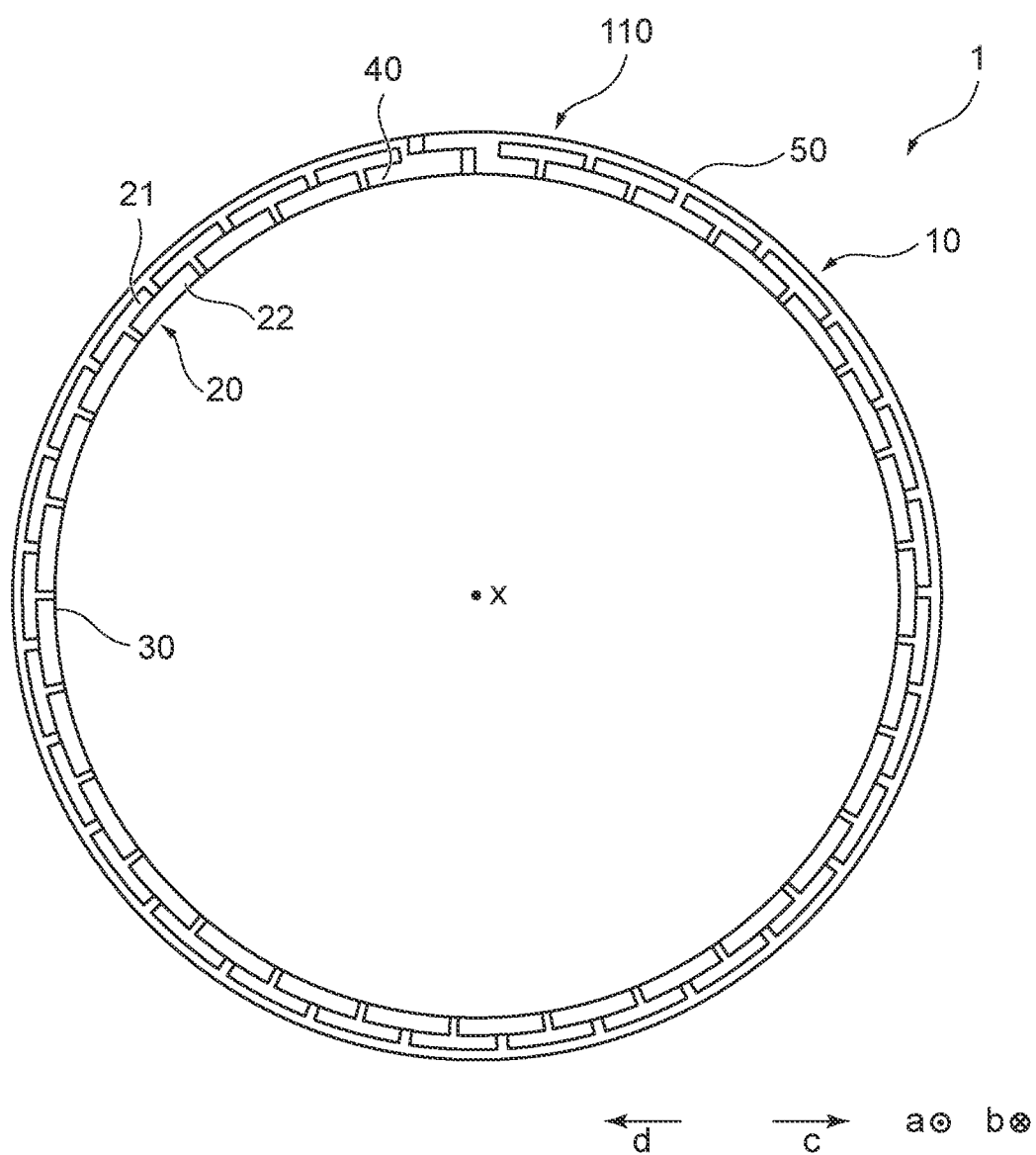
FIG. 1 is a front view for illustrating the schematic configuration of a sealing device according to an embodiment of the present disclosure.
Figure 2:
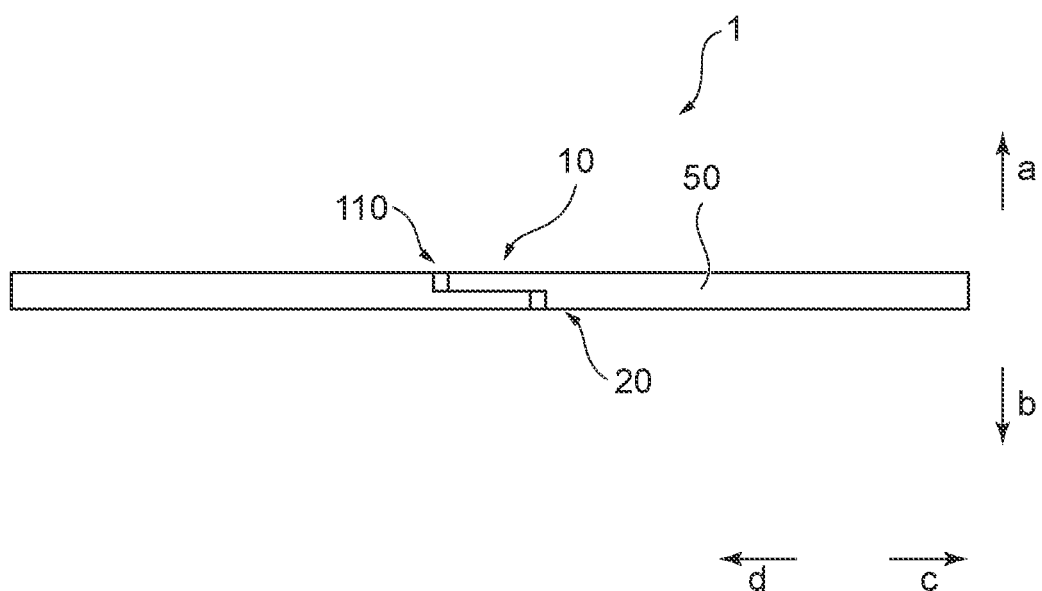
FIG. 2 is a view of the sealing device illustrated in FIG. 1 seen from the side of the outer peripheral surface.
Figure 3:
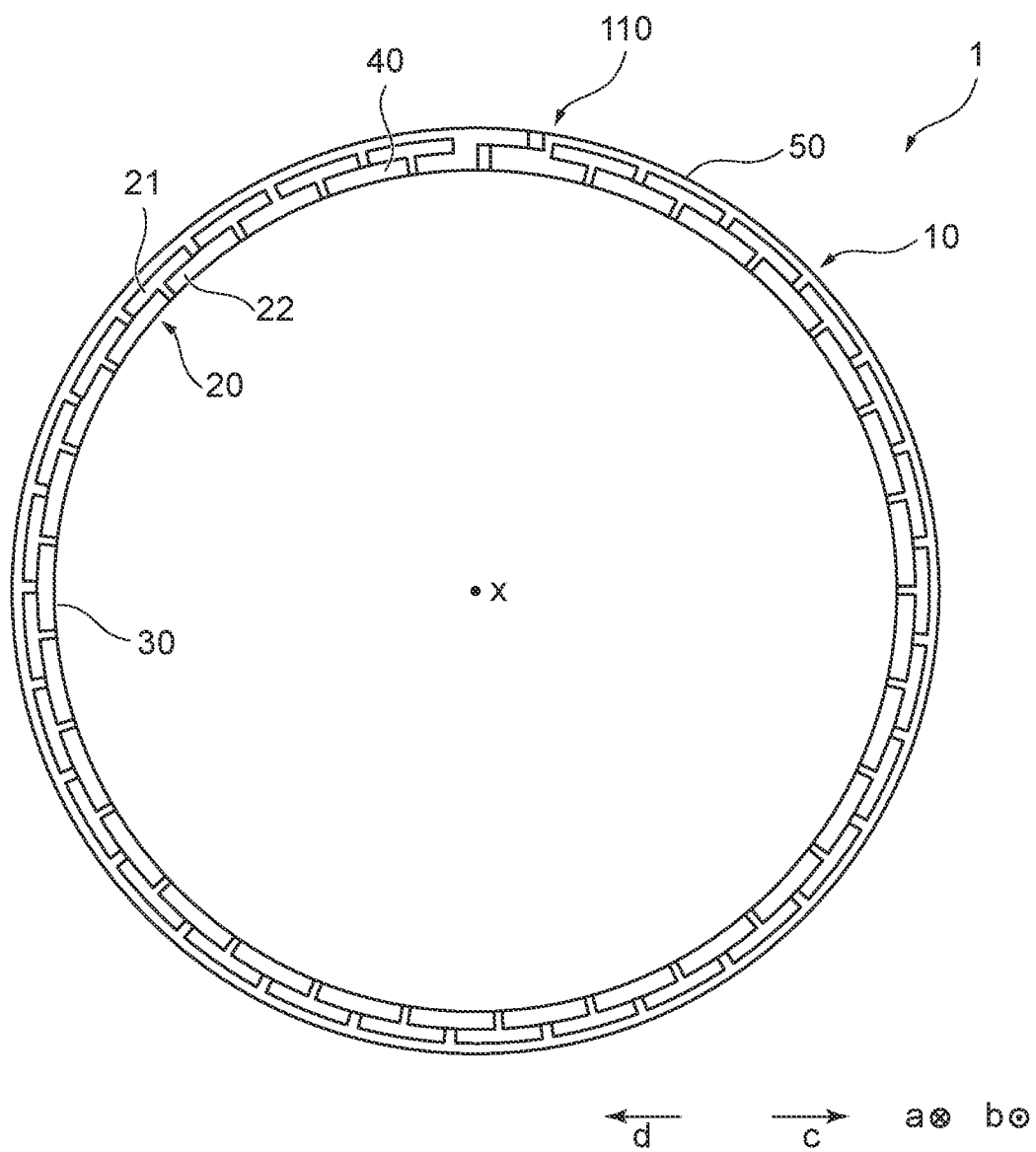
FIG. 3 is a rear view of the sealing device illustrated in FIG. 1.
Figure 4:
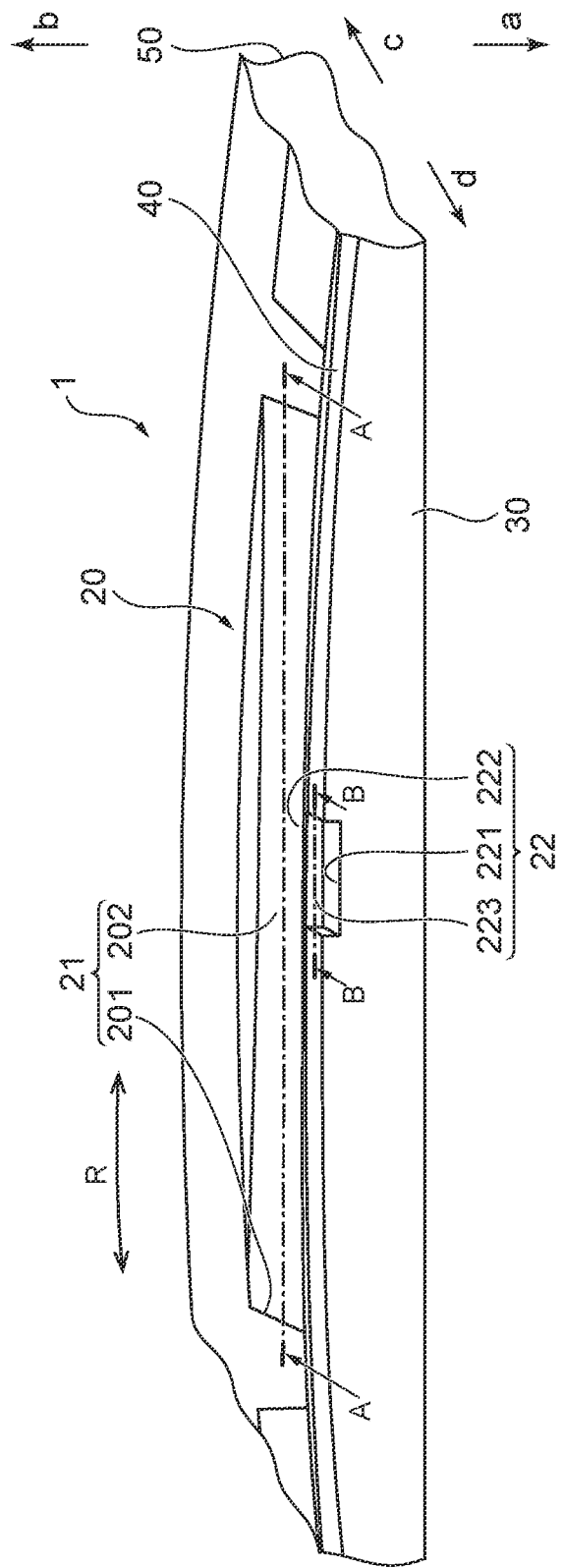
FIG. 4 is an enlarged perspective view of a sliding portion of the sealing device illustrated in FIG. 3.
Figure 5:
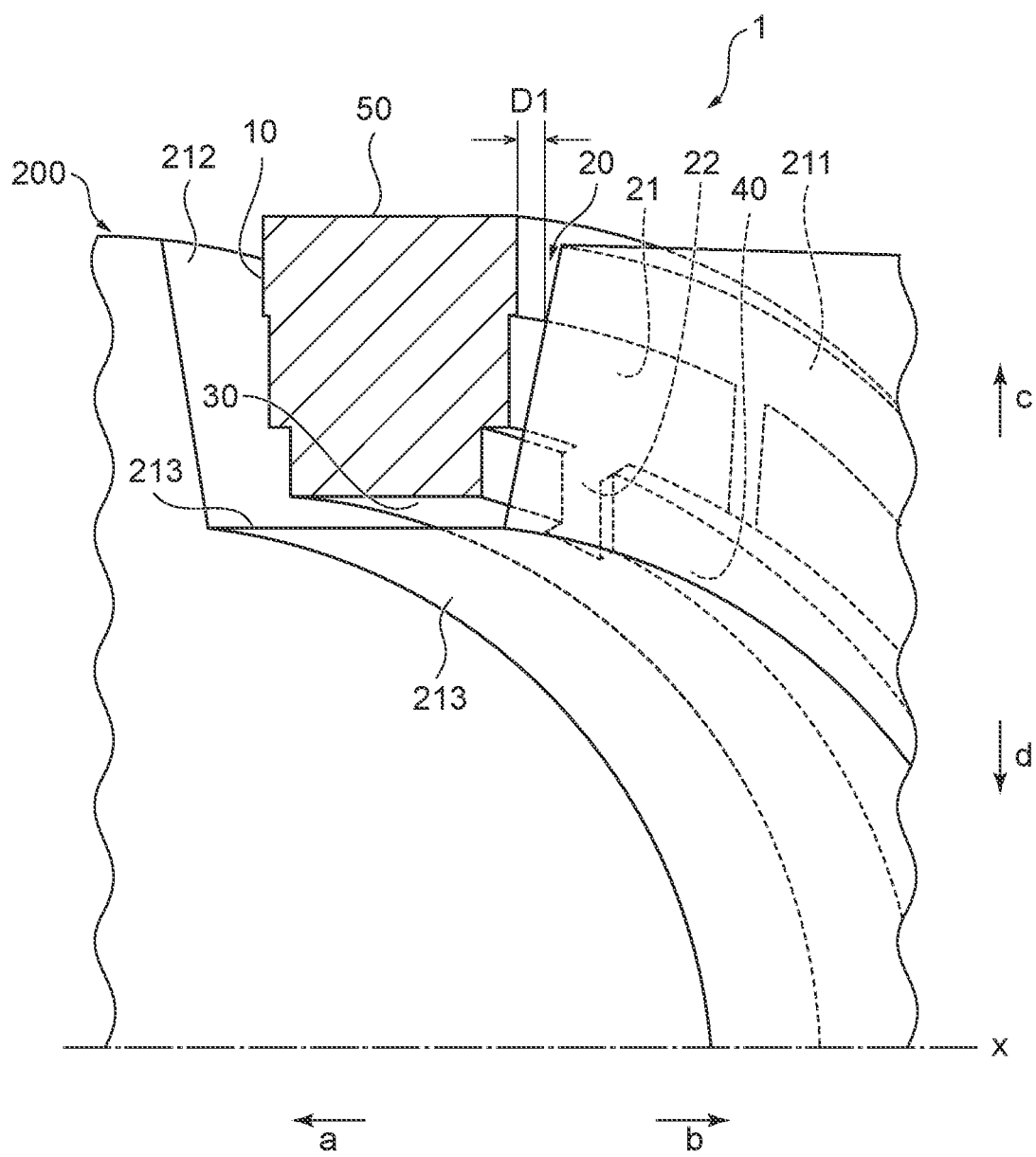
FIG. 5 is a cross-sectional perspective view of a cross-section along an axis of the sealing device illustrated in FIG. 1 in the usage state.

FIG. 1 is a front view for illustrating the schematic configuration of a sealing device 1 according to an embodiment of the present disclosure. FIG. 2 is a view of the sealing device 1 seen from the side of the outer peripheral surface. FIG. 3 is a rear view of the sealing device 1. FIG. 4 is an enlarged perspective view of a sliding portion of the sealing device 1. FIG. 5 is a cross-sectional perspective view of a cross-section along an axis x of the sealing device 1 in the usage state.

Hereinafter, for convenience's sake of description, as illustrated in FIGS. 1 to 5, the direction of an arrow a along the direction of the axis x (i.e., one side in the direction of the axis) shall be assumed as the high pressure side, and the direction of an arrow b along the direction of the axis x (i.e., the other side in the direction of the axis) shall be assumed as the low pressure side. In addition, regarding the direction perpendicular to the axis x (hereinafter also referred to as a "radial direction"), a direction away from the axis x, that is, the direction of an arrow c shall be assumed as the outer periphery side, and a direction toward the axis x, that is, the direction of an arrow d shall be assumed as the inner periphery side. In the present embodiment, the side of the sealing device 1 seen from one side to the other side along the direction of the axis x as illustrated in FIG. 1 shall be assumed as the front side, while the side of the sealing device 1 seen from the other side to the one side along the direction of the axis x as illustrated in FIG. 3 shall be assumed as the rear face.

As illustrated in FIGS. 1 to 5, the sealing device 1 according to the present embodiment is a seal ring used to seal an annular gap between a shaft 200 and a housing 300 (see FIG. 8), which rotate with respect to each other, for maintaining the fluid pressure (i.e., oil pressure in the present embodiment) in a transmission, such as an AT and a CVT, for an automobile, for example. In addition, in the following description, the "high pressure side" means the side on which the pressure is at a higher level when a pressure difference is generated between the opposite sides of the sealing device 1, while the "low pressure side" means the side on which the pressure is at a lower level when a pressure difference is generated between the opposite sides of the sealing device 1. The sealing device 1 is configured to change the fluid pressure in a region on the left side in FIG. 5, and serves the function of maintaining the fluid pressure in a target region to be sealed on the left side in FIG. 5. It should be noted that in a state where an engine of the automobile has stopped, the fluid pressure in the target region to be sealed is low, and no load is applied to the region, while when the engine is started, the fluid pressure in the target region to be sealed becomes high. FIG. 5 illustrates a state where the fluid pressure on the left side in FIG. 5 is at a higher level than that on the right side. Hereinafter, one side that is the left side in FIG. 8 shall be assumed as the high pressure side, and the other side that is the right side shall be assumed as the low pressure side.

The sealing device 1 according to an embodiment of the present disclosure is an annular sealing device that is configured to be mounted in an annular groove 210 provided on the outer periphery of a shaft 200 so as to seal an annular space S between the shaft 200 and the housing 300 that rotate with respect to each other, and change the fluid pressure in the space, and that maintains the fluid pressure in a target region to be sealed, and slidably contacts one of sidewall surfaces 211 and 212 on the lower pressure side of the annular groove 210. The sealing device 1 includes a sliding portion 20 that slides on the sidewall surface 211 or 212, an inner periphery portion 30 that contacts the shaft 200, a sliding portion groove 21 that is formed in the sliding portion 20 so as to extend in the circumferential direction and is recessed in the direction of the axis x, an introduction groove 22 that is formed to extend from the sliding portion groove 21 to the inner periphery portion 30 and is recessed in the direction of the axis x, and an inner periphery groove 40 that is provided in the joined portion of the sliding portion 20 and the inner periphery portion 30 and is recessed in the direction of the axis x. Hereinafter, the sealing device 1 will be specifically described.

As illustrated in FIGS. 1 to 3, the sealing device 1 is formed in an annular shape as a whole. The sealing device 1 includes a disk portion 10, the sliding portion 20, the inner periphery portion 30, an outer peripheral surface 50, and a fitted portion 110. The sealing device 1 is formed such that the circumferential length of the outer peripheral surface 50 is shorter than the circumferential length of the inner peripheral surface of a shaft hole in the housing 300, and has no interference. Thus, in a state where no fluid pressure is applied, the outer peripheral surface 50 of the sealing device 1 can be separated from the inner peripheral surface of the housing 300.

The disk portion 10 is formed in the shape of a disk with its center lying along the direction of the axis x on each of the front side illustrated in FIG. 1 and the rear side illustrated in FIG. 3. The disk portion 10 is formed flat or substantially flat in the radial direction and the circumferential direction that are perpendicular to the direction of the axis x. The disk portion 10 faces the sidewall surfaces 211 and 212 of the annular groove 210 formed in the shaft 200, along the direction of the axis x (see FIG. 5).

The sliding portion 20 is formed on the disk portion 10 on each of the front side illustrated in FIG. 1 and the rear side illustrated in FIG. 3. The disk portion 10 is formed flat or substantially flat in the radial direction and the circumferential direction that are perpendicular to the direction of the axis x except the portions where the sliding portion groove 21, the introduction groove 22, and the inner periphery groove 40 of the sliding portion 20 are provided. The sliding portion 20 faces the sidewall surface 211 or 212 of the annular groove 210 formed in the shaft 200, for example, along the direction of the axis x (see FIG. 5). The sliding portion 20 includes the sliding portion groove 21 and the introduction groove 22, as described above.

As illustrated in FIG. 3, a plurality of sliding portion grooves 21 are provided at equal intervals along the entire circumference of the side surface of the sliding portion 20 on the side of the sliding surface except a portion around the fitted portion 110, for example.

As illustrated in FIG. 4, each sliding portion groove 21 is provided to generate dynamic pressure when the sealing device 1 has slid on the sidewall surface 211 or 212 on the low pressure side of the annular groove 210 provided in the shaft 200 in the usage state. Each sliding portion groove 21 has a constant width in the radial direction and is formed in an arc shape or substantially in an arc shape so as to extend in the circumferential direction R, for example.

As illustrated in FIG. 5, each sliding portion groove 21 is provided in a region where it can contact the sidewall surface 211 or 212 on the low pressure side of the annular groove 210, for example, the sidewall surface 211 in FIG. 5 in the usage state. That is, each sliding portion groove 21 is provided at a position close to the inner periphery portion 30 of the sliding portion 20 so as to be located within a sliding region where the sliding portion 20 slides on the sidewall surface 211 in the radial direction. Each sliding portion groove 21 is formed in the shape of a recessed groove with a depth extending from the other side to the one side in the direction of the axis x. The depth of each sliding portion groove 21 in the radial direction is set constant, for example.

Figure 6:
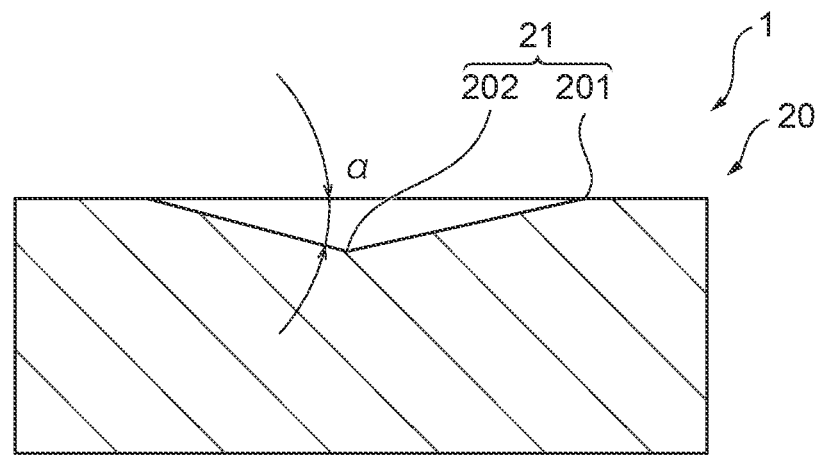
FIG. 6 is a cross-sectional view of a sliding portion groove of the sealing device illustrated in FIG. 4 along a cross-section A-A.

FIG. 6 is a cross-sectional view of the sliding portion groove 21 of the sealing device 1 along a cross-section A-A. As illustrated in FIG. 6, the depth of the sliding portion groove 21 is set such that the bottom of the sliding portion groove 21 in the circumferential direction is shallower at end portions 201 on the opposite end sides than at a central portion 202 that is the center in the circumferential direction, for example. Therefore, the sliding portion groove 21 is formed such that its bottom has a predetermined angle α with respect to the sliding portion 20 in a region from the central portion 202 to the end portions 201 on the opposite end sides.

Figure 7:
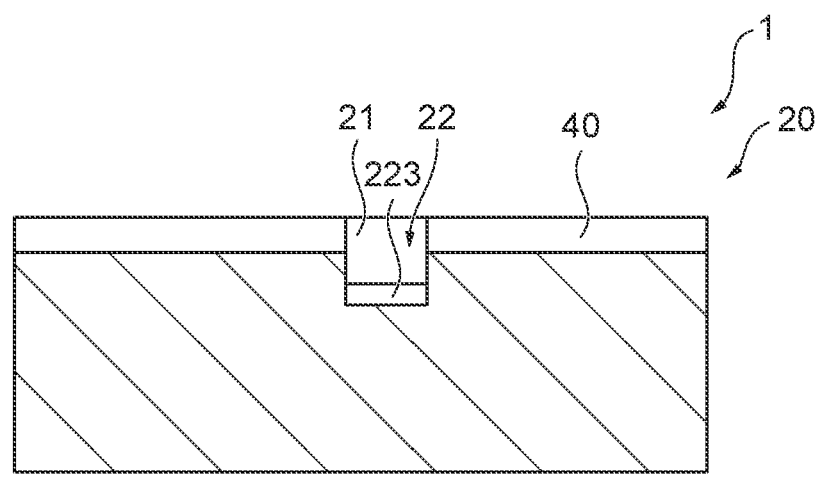
FIG. 7 is a cross-sectional view of an introduction groove of the sealing device illustrated in FIG. 4 along a cross-section B-B.

FIG. 7 is a cross-sectional view of the introduction groove 22 of the sealing device 1 along a cross-section B-B. As illustrated in FIGS. 4, 5, and 7, the introduction groove 22 is provided at the central position of the sliding portion groove 21 in the circumferential direction, for example. The introduction groove 22 is formed such that it extends from the sliding portion groove 21 to the inner periphery portion 30 on the inner periphery side, that is, it penetrates through a region from the sliding portion groove 21 to the inner periphery portion 30. The introduction groove 22 guides a target fluid to be sealed into the sliding portion groove 21 from the annular groove 210 of the shaft 200. The introduction groove 22 is formed in the shape of a recessed groove with a depth extending from the other side to the one side in the direction of the axis x. The introduction groove 22 is formed such that its bottom is deeper than the bottoms of the inner periphery groove 40 and the sliding portion groove 21, for example. The introduction groove 22 is formed such that its bottom becomes shallower in the direction from an inner peripheral bottom portion 221 facing the inner periphery portion 30 to an outer peripheral bottom portion 222 on the outer periphery side through a stepped step portion 223, for example. It should be noted that the depth of the bottom of the introduction groove 22 is not limited to the example described above.

The inner periphery portion 30 is formed in a cylindrical shape, and faces a peripheral wall surface 213 of the annular groove 210 in the inner circumferential direction. The inner periphery portion 30 is provided with the inner periphery groove 40, which is recessed in the direction of the axis x, in the joined portion of the sliding portion 20 and the inner periphery portion 30, that is, in each of an end portion of the inner periphery portion 30 on one side in the direction of the axis x (i.e., the direction of the arrow a) and an end portion on the other side (i.e., the direction of the arrow b).

The inner periphery groove 40 is a groove that is continuous in an annular shape around the joined portion so as to extend in the circumferential direction. A surface of the inner periphery groove 40 on the inner periphery side faces the peripheral wall surface 213 of the annular groove 210 of the shaft 200 in the usage state, and a surface of the inner periphery groove 40 on the side of the sliding portion 20 faces the sidewall surface 211 or 212 of the annular groove 210 in the usage state. The inner periphery groove 40 is connected to the introduction groove 22 on the outer periphery side in the radial direction. That is, the inner periphery groove 40 communicates with the sliding portion groove 21 via the introduction groove 22. An end portion of the inner periphery groove 40 on the outer periphery side in the radial direction extends to an end portion of the sliding portion groove 21 on the inner periphery side or its vicinity.

The outer peripheral surface 50 is formed in a cylindrical shape, and faces the housing 300 in the outer circumferential direction.

The fitted portion 110 is provided at a portion of the sealing device 1 in the circumferential direction. The fitted portion 110 is cut in a stepwise manner as seen from all of the side of the outer peripheral surface 50, the side of the disk portion 10, and the sliding portion 20. As the fitted portion 110 is formed in a stepwise manner in this way, the fitted portion 110 has a property of maintaining stable seal performance even when the circumferential length of the sealing device 1 has changed due to thermal expansion or shrinkage.

The sealing device 1 is formed of a resin material, such as polyether ether ketone (PEEK), polyphenylene sulfide (PPS), or polytetrafluoroethylene (PTFE).

Next, the usage state of the aforementioned sealing device 1 will be described.

Figure 8:
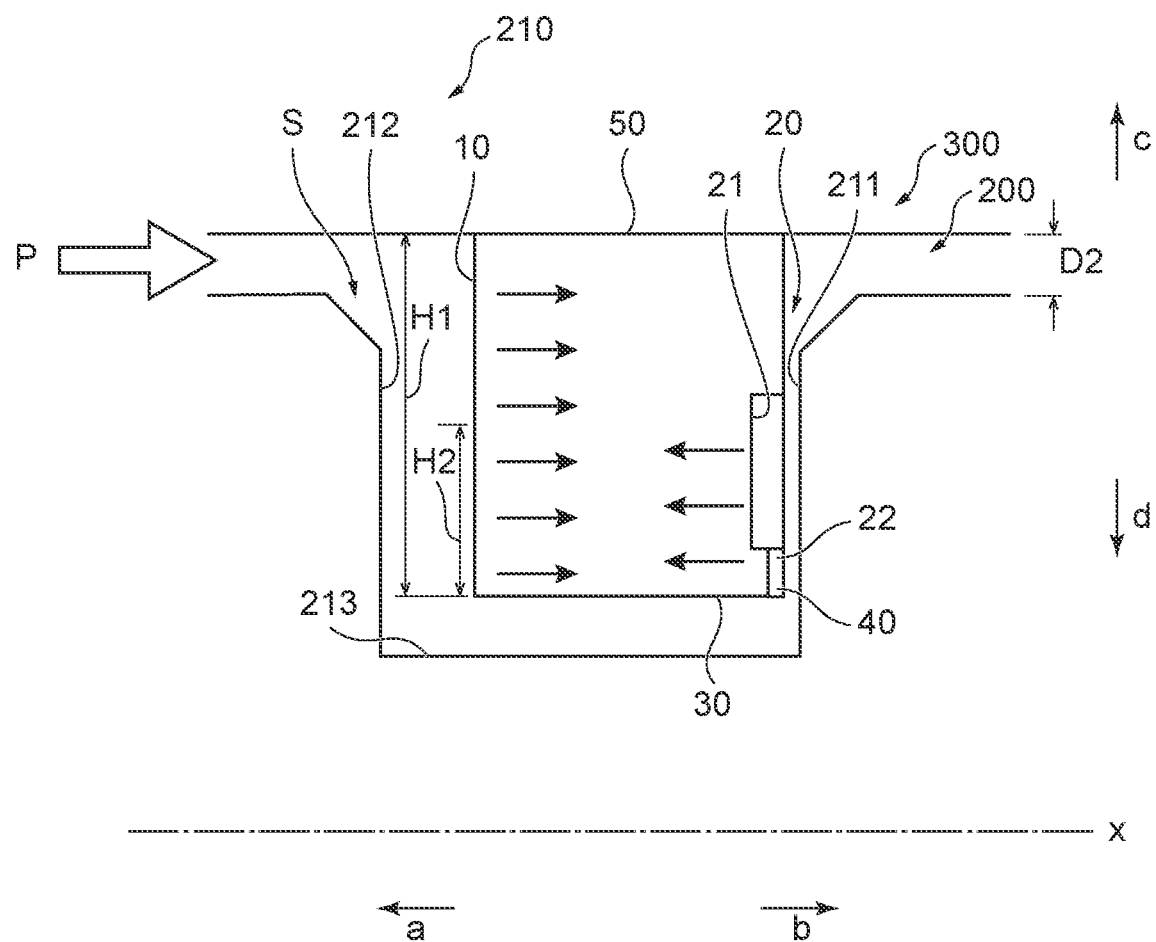
FIG. 8 is a cross-sectional view of a cross-section along the axis of the sealing device illustrated in FIG. 1 in the usage state.

FIG. 8 is a cross-sectional view of a cross-section along the axis x of the sealing device 1 in the usage state.

As illustrated in FIG. 8, the sealing device 1 is mounted in the annular groove 210 provided on the outer periphery of the shaft 200 so as to seal the annular space S between the shaft 200 and the housing 300 (i.e., the inner peripheral surface of a shaft hole in the housing 300 for passing the shaft 200) that rotate with respect to each other. Accordingly, the sealing device 1 maintains the fluid pressure (i.e., oil pressure P) in a target region to be sealed that is configured to have the oil pressure therein changed. Herein, FIG. 8 illustrates the sealing device 1 in a state where the fluid pressure on the left side in FIG. 8 is higher than that on the right side as in FIG. 5. Specifically, FIG. 8 illustrates a state where a pressure difference is generated via the sealing device 1 as the engine (not illustrated) having the sealing device 1 attached thereto has been started. In the state where the engine has been started and a pressure difference is thus generated, the sealing device 1 is tightly attached to the sidewall surface on the low pressure side of the annular groove 210, for example, the sidewall surface 211 and the inner peripheral surface of the shaft hole in the housing 300 in FIG. 8. In addition, in such a state, the inner periphery portion 30 of the sealing device 1 is lifted from the peripheral wall surface 213 of the annular groove 210. Further, in such a state, an extrusion gap D2 is generated between the inner peripheral surface of the housing 300 and the outer peripheral surface of the shaft 200.

As illustrated in FIG. 8, the sealing device 1 in the usage state seals the annular space S between the shaft 200 and the housing 300 that rotate with respect to each other. Accordingly, the sealing device 1 can maintain the oil pressure P in the target region to be sealed (i.e., the region on the high pressure side) that is configured to have the oil pressure P therein changed. Herein, the sliding portion 20 of the sealing device 1 slides on the sidewall surface 211 on the low pressure side of the annular groove 210 when the shaft 200 and the housing 300 rotate with respect to each other. At this time, dynamic pressure is generated in the sealing device 1 when a target fluid to be sealed flows out to the sliding portion 20 from the sliding portion grooves 21, the introduction grooves 22, and the inner periphery groove 40 provided in the sliding portion 20 of the sealing device 1. When the sealing device 1 rotates in the clockwise direction with respect to the annular groove 210 in FIG. 3, the target fluid to be sealed flows out to the sliding portion 20 from the end portion 201 of the sliding portion groove 21 on the side of the counterclockwise direction. Meanwhile, when the sealing device 1 rotates in the counterclockwise direction with respect to the annular groove 210 in FIG. 3, the target fluid to be sealed flows out to the sliding portion from the end portion 201 of the sliding portion groove 21 on the side of the clockwise direction.

According to the aforementioned sealing device 1, a target fluid to be sealed is guided into the sliding portion grooves 21, the introduction grooves 22, and the inner periphery groove 40 as described above. Therefore, the fluid pressure acting on the sealing device 1 from the high pressure side and the fluid pressure acting thereon from the low pressure side are cancelled out each other in the region where the sliding portion grooves 21, the introduction grooves 22, and the inner periphery groove 40 are provided in the sliding portion 20, for example, in the range of up to the height H2 from the inner periphery portion 30 illustrated in FIG. 8. Accordingly, the sealing device 1 can reduce an area in which the fluid pressure (i.e., the fluid pressure acting from the high pressure side to the low pressure side) is received by an amount corresponding to the region where the sliding portion grooves 21, the introduction grooves 22, and the inner periphery groove 40 are provided in the sliding portion 20 (i.e., the region closer to the inner periphery side than is the height H2 from the inner periphery portion 30).

In addition, according to the sealing device 1, dynamic pressure is generated when a target fluid to be sealed flows out to the sliding portion from the sliding portion grooves 21, the introduction grooves 22, and the inner periphery groove 40 when the sliding portion 20 slides on the sidewall surface 211 or 212 on the low pressure side of the annular groove 210. Accordingly, a force of pushing the sealing device 1 away from the sidewall surface 211 or 212 is generated.

As described above, according to the sealing device 1, as the sliding portion 20 is provided with the sliding portion grooves 21, the introduction grooves 22, and the inner periphery groove 40, and the pressure-receiving area is thus reduced, rotation torque can be effectively reduced. In this manner, according to the sealing device 1, as rotation torque (i.e., sliding torque) can be reduced, the generation of heat due to sliding can be suppressed, and thus, the sealing device 1 can be favorably used even under the conditions of a high-speed, high-pressure environment. Along with this, according to the sealing device 1, a soft material, such as aluminum, can be used as the material of the shaft 200.

In addition, according to the sealing device 1, as a target fluid to be sealed can be introduced to the sliding portion 20 from the sliding portion grooves 21, the introduction grooves 22, and the inner periphery groove 40, a fluid film (i.e., an oil film) can be formed on the sidewall surface 211 or 212 more efficiently. That is, according to the sealing device 1, rotation torque can be effectively reduced.

Further, according to the sealing device 1, the sliding portion grooves 21, the introduction grooves 22, and the inner periphery groove 40 are provided in the sliding region where the sliding portion 20 slides on the sidewall surface 211 or 212 of the annular groove 210 of the shaft 200 in the usage state. That is, since the sliding portion grooves 21, the introduction grooves 22, and the inner periphery groove 40 are provided at positions below the height H2, which does not correspond to the region of the extrusion gap D2, with respect to the height H1 of the sliding portion 20, leakage of the target fluid to be sealed can be suppressed.

Furthermore, according to the sealing device 1, as illustrated in FIG. 6, if each sliding portion groove 21 is formed such that its bottom is shallower at the end portions 201 on the opposite end sides than at the central portion 202 that is the center in the circumferential direction, the aforementioned dynamic pressure can be effectively generated with the wedge effect. In particular, when a structure is adopted in which the bottom of each sliding portion groove 21 gradually becomes shallower from the central portion 202 to the end portions 201 on the opposite sides, the wedge effect can be stably exerted even if the sliding portion 20 of the sealing device 1 has worn off with time.

Figure 9:
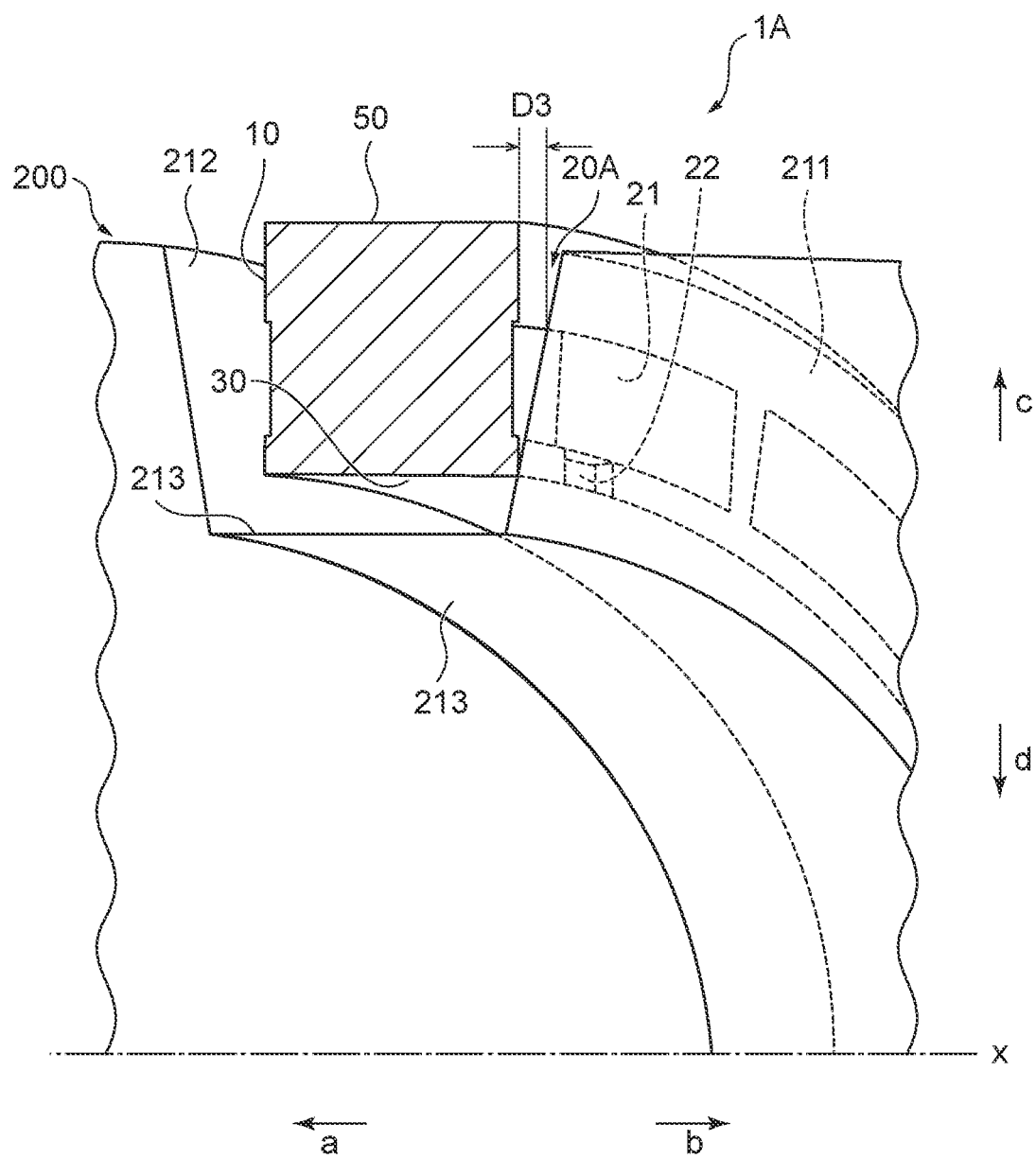
FIG. 9 is a cross-sectional perspective view of a cross-section along an axis of a sealing device according to a reference example.

FIG. 9 is a cross-sectional perspective view of a cross-section along an axis x of a sealing device 1A according to a reference example. The sealing device 1A according to the reference example differs from the sealing device 1 described previously in that the inner periphery groove 40 is not provided in the joined portion of an end portion of a sliding portion 20A on the inner periphery side and the inner periphery portion 30.

As illustrated in FIG. 9, the sealing device 1A according to the reference example is not provided with the inner periphery groove 40 in the joined portion of an end portion of the sliding portion 20A on the inner periphery side and the inner periphery portion 30. Therefore, in the sealing device 1A, when the sidewall surfaces 211 and 212 of the annular groove 210 of the shaft 200, for example, the sidewall surface 211 is formed such that it opens toward the outer periphery side from the peripheral wall surface 213 in FIG. 9, an end portion of the sliding portion 20A on the inner periphery side contacts the sidewall surface 211. In addition, even when the shaft 200 is tilted for some reason, the end portion of the sliding portion 20A on the inner periphery side also contacts the sidewall surface 211. In such a case, a gap D3 generated between the sliding portion 20A of the sealing device 1A and the sidewall surface 211 is increased. Thus, an improvement in the sealing performance has been desired.

In contrast, in the sealing device 1, the inner periphery groove 40 is provided in an end portion of the sliding portion 20 on the inner periphery side. Accordingly, the sealing device 1 can contact the sidewall surface 211 of the annular groove 210 of the shaft 200 at a portion around the inner periphery groove 40 when the sidewall surface 211 is formed such that it opens toward the outer periphery side from the peripheral wall surface 213 as illustrated in FIG. 5. Therefore, according to the sealing device 1, a gap D1 generated between the sliding portion 20 and the sidewall surface 211 can be reduced, and thus, the sealing performance can be improved.

As described above, with the sealing device 1 according to the first embodiment of the present disclosure, rotation torque can be reduced.

Although the embodiment of the present disclosure has been described, the present disclosure is not limited to the aforementioned embodiment of the present disclosure, and includes all aspects encompassed by the concept and the claims of the present disclosure. In addition, the aforementioned structures may be selectively combined as appropriate so as to achieve at least some of the aforementioned object and effects. For example, the shape, material, arrangement, size, and the like of each component in the aforementioned embodiment may be changed as appropriate depending on a specific usage pattern of the present disclosure.

Figure 10:
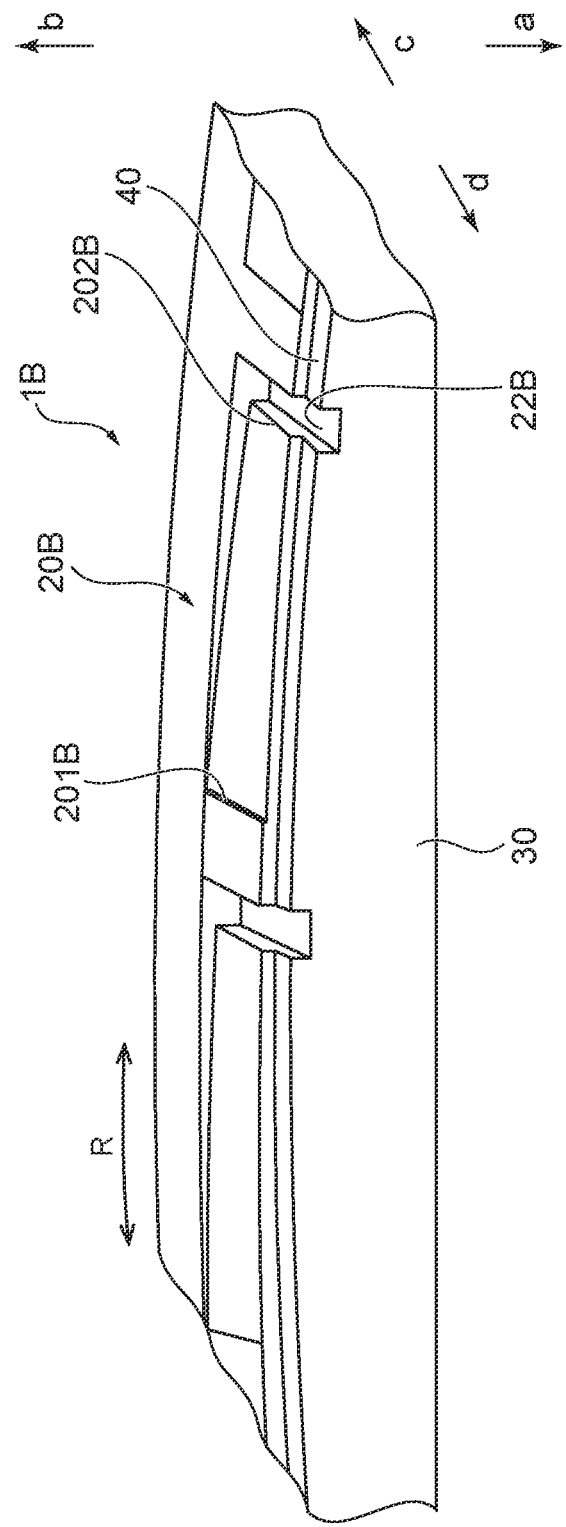
FIG. 10 is an enlarged perspective view illustrating a modified example of the sliding portion of the sealing device according to the embodiment of the present disclosure.

FIG. 10 is an enlarged perspective view illustrating a modified example of a sliding portion 20B of a sealing device 1B according to an embodiment of the present disclosure. As illustrated in FIG. 10, in the present disclosure, an introduction groove 22B of a sliding portion groove provided in the sliding portion 20B of the sealing device 1 is not limited to the one provided at the central portion of the sliding portion groove in the circumferential direction as described above, and may be provided at an end portion 202B of the sliding portion groove in the circumferential direction, for example. In such a case, the sliding portion groove may be formed such that its bottom gradually becomes shallower from the end portion 202B to an end portion 201B.

In addition, in the sealing device 1, the shape of each sliding portion groove 21 is not limited to the aforementioned shape, and various structures can be adopted. For example, in the sealing device 1, each sliding portion groove 21 provided in the sliding portion 20 may be formed such that its bottom in a planar shape gradually becomes shallower from the center in the circumferential direction to the opposite sides. In addition, in the sealing device 1, each sliding portion groove 21 may be formed such that its bottom in a curved shape gradually becomes shallower from the center in the circumferential direction to the opposite sides. Further, in the sealing device 1, each sliding portion groove 21 may be formed such that its bottom becomes shallower in a stepwise manner from the center in the circumferential direction to the opposite sides. Furthermore, in the sealing device 1, each sliding portion groove 21 may be formed such that its bottom becomes shallower in a stepwise manner from the center in the circumferential direction to the opposite sides, and the stepped portion may be formed of an inclined surface. In this manner, when the sealing device 1 is formed such that the bottom of each sliding portion groove 21 is shallower on its opposite end sides than at the center in the circumferential direction, dynamic pressure can be generated more effectively with the wedge effect.

In each of the sealing devices 1 and 1B, the sliding portion grooves 21, the introduction grooves 22 or 22B, and the inner periphery grooves 40 are provided on the opposite sides of the disk portion 10. As the sliding portions 20 are provided on the opposite sides of the disk portion 10 in this manner, it is possible to achieve the aforementioned operational advantages, for example, reduce the area in which the fluid pressure is received, even when each of the sealing devices 1 and 1B is tightly attached to the sidewall surface 212 facing the disk portion 10 on one side and the inner peripheral surface of the shaft hole in the housing 300 in addition to the sidewall surface 211 of the annular groove 210 facing the disk portion 10 on the other side, that is, even when the low pressure side and the high pressure side are switched according to circumstances between the one side and the other side.

In addition, the structure of the sealing device 1 is not limited to the one in which the aforementioned fitted portion 110 and the plurality of sliding portion grooves 21 are formed in an annular member with a rectangular cross-section, which does not necessarily mean that an annular member with a rectangular cross-section should be used as a material and that the fitted portion 110 and the plurality of sliding portion grooves 21 should be formed therein through machining. Needless to say, it is also possible to obtain the sealing device 1 by first molding an annular member with a rectangular cross-section and then performing cutting machining thereon. For example, it is possible to obtain the sealing device 1 by first molding a device having the fitted portion 110 in advance, and then forming the plurality of sliding portion grooves 21 therein through cutting machining, and the manufacturing process used therefor is not limited to a specific process.

Further, the shape of the fitted portion 110 is not limited to the aforementioned shape. For example, shapes, such as straight-cut, bias-cut, and step-cut, may be adopted. It should be noted that when a low elastic material (such as PTFE) is adopted as the material of the sealing device 1, an endless structure may be formed without the fitted portion 110 provided.

The direction of each of the aforementioned sealing devices 1 and 1B has only been determined for convenience's sake of description. Therefore, for example, in each of the sealing devices 1 and 1B, the direction of the arrow a along the direction of the axis x (i.e., one side in the direction of the axis) may be the low pressure side, and the direction of the arrow b along the direction of axis x (i.e., the other side in the direction of the axis) may be the high pressure side.

Further, in each of the aforementioned sealing devices 1 and 1B, the sliding portion 20 or 20B is provided on each of one side and the other side of the disk portion 10, and the sliding portion 20 or 20B is provided with the sliding portion grooves 21, the introduction grooves 22 or 22B, and the inner periphery groove 40. However, in the present disclosure, the sliding portion 20 may be provided only on one side or the other side of the disk portion 10.

The invention claimed is:

1. An annular sealing device that is configured to be mounted in an annular groove provided on an outer periphery of a shaft so as to seal an annular space between the shaft and a housing that rotate with respect to each other, and change a fluid pressure in the space, and that maintains a fluid pressure in a target region to be sealed, and slidably contacts a sidewall surface on a low pressure side of the annular groove, comprising:
   a sliding portion that slides on the sidewall surface;
   an inner periphery portion that contacts the shaft;
   a sliding portion groove formed in the sliding portion so as to extend in a circumferential direction, the sliding portion groove being recessed in a direction of an axis;
   an introduction groove formed so as to extend from the sliding portion groove to the inner periphery portion, the introduction groove being recessed in the direction of the axis; and
   an inner periphery groove provided in a joined portion of the sliding portion and the inner periphery portion, the inner periphery groove being recessed in the direction of the axis,
   wherein the inner periphery groove communicably connects adjacent introduction grooves in the circumferential direction, and
   wherein a depth of the introduction groove along the axis is greater than a depth of the inner periphery groove along the axis, which his greater than a depth of the sliding portion groove along the axis.

2. The sealing device according to claim 1, wherein the sliding portion groove is provided in a region where the sliding portion groove can contact the sidewall surface in a radial direction of the sliding portion in a usage state.

3. The sealing device according to claim 1, wherein the introduction groove is provided at a position of an end portion of the sliding portion groove in the circumferential direction.

4. The sealing device according to claim 1, wherein the introduction groove is provided at a central position of the sliding portion groove in the circumferential direction.

5. The sealing device according to claim 1, wherein the sliding portion groove is formed such that the sliding portion groove has a constant width in the radial direction.

6. The sealing device according to claim 1, wherein a surface of the inner periphery groove on an inner periphery side faces a peripheral wall surface of the annular groove in a usage state, and a surface of the inner periphery groove on a side of the sliding portion faces the sidewall surface of the annular groove in the usage state.

* * * * *